(12) United States Patent
Keller-Tuberg

(10) Patent No.: US 7,639,689 B2
(45) Date of Patent: Dec. 29, 2009

(54) METHOD FOR EXCHANGING PACKETS OF USER DATA

(75) Inventor: Stefan Keller-Tuberg, Kareela (AU)

(73) Assignee: Alcatel, Paris (FR)

( * ) Notice: Subject to any disclaimer, the term of this patent is extended or adjusted under 35 U.S.C. 154(b) by 663 days.

(21) Appl. No.: 11/283,710

(22) Filed: Nov. 22, 2005

(65) Prior Publication Data
US 2006/0209832 A1 Sep. 21, 2006

(30) Foreign Application Priority Data
Mar. 17, 2005 (EP) .................................. 05290613

(51) Int. Cl.
H04L 12/28 (2006.01)
(52) U.S. Cl. ........................ 370/392; 370/401; 370/475; 709/246
(58) Field of Classification Search ........................ None
See application file for complete search history.

(56) References Cited

U.S. PATENT DOCUMENTS

| | | |
|---|---|---|
| 2002/0023171 A1 | 2/2002 | Garrett |
| 2003/0037163 A1 | 2/2003 | Kitada |
| 2006/0184695 A1 * | 8/2006 | Monette et al. ............. 709/246 |
| 2007/0297420 A1 * | 12/2007 | Holmgren et al. ........... 370/397 |
| 2008/0212598 A1 * | 9/2008 | Kolli et al. .................. 370/409 |

FOREIGN PATENT DOCUMENTS

WO  WO 03/067822 A  8/2003

* cited by examiner

Primary Examiner—Jayanti K Patel
Assistant Examiner—Jung Park
(74) Attorney, Agent, or Firm—Harness, Dickey & Pierce, P.L.C.

(57) ABSTRACT

In a method for exchanging packets of user data between a terminal (4a, 4b) of a first network (1) and a service provider (5a, 5b) of a second network (2), the first network (1) is connected to the second network (2) by a gateway (3) which has a unique connection (6a, 6b) to the service provider (5a, 5b), the terminal (4a, 4b) has a first address which is unique within the first network (1), and the terminal (4a, 4b) is configurable with a second address which uniquely identifies a particular service from the service provider (5a, 5b) and which is unique within the second network (2), the method comprising the steps of: allocating the first address being unique within the first network (1) to the terminal (4a, 4b), sending a first packet of user data containing the first and second address from the terminal (4a, 4b) to the service provider (5a, 5b) which identifies the first packet by the presence of the second address and extracts the first address from the first packet, and sending a second packet of user data containing the first address from the service provider (5a, 5b) to the terminal (4a, 4b) which identifies the second packet by the presence of the first address.

8 Claims, 1 Drawing Sheet

METHOD FOR EXCHANGING PACKETS OF USER DATA

BACKGROUND OF THE INVENTION

The invention is based on a priority application EP 05290613.8 which is hereby incorporated by reference.

The invention relates to a method for exchanging packets of user data between a terminal of a first network and a service provider of a second network.

For exchanging data between a service provider and a terminal, it is mandatory that both can establish a means by which to identify each other in ongoing communications. In the case that the service provider is an Internet service provider, e.g. of a DSL or other broadband network being deployed for high speed Internet services, and the terminal is a subscriber terminal of a home LAN, such a means is usually provided by the Internet service provider attributing an unique IP address to the terminal. In doing this, the Internet provider follows an approach for IP address allocation which assures that the same IP address cannot be attributed to more than one subscriber terminal.

If a second or subsequent service, e.g. a video service from a video service provider, is going to be offered, it is desirable that the IP address allocation strategy for the new service does not interfere with the existing IP address allocation strategy of the Internet service provider. Hence, it has to be ensured that when the Internet subscriber connects a set top box to their home LAN their home computers continue to connect with the ISP and the new set top box (video terminal) connects with the video service provider.

Normally, high speed Internet services are delivered to computers, and video services are delivered to set top boxes or Personal Video Recorders. Each service provider normally allocates its own IP address, subnet mask, default gateway and DNS so that the subscriber can connect the right equipment with the right service provider's service. When the subscriber requires two or more service providers, this normally means that there must be two separate IP configurations.

Ideally, the subscriber just connects the new set top box onto their home LAN because the cable is already there and the DSL modem (for example) is already there. But now, the computer and set top box need to receive their IP configuration so that they can communicate with the correct service provider.

One approach is to statically configure routes, subnets and default gateways into the DSL modem, or the set top box, or the computer, or a combination of these.

Another approach is to run new LAN cabling through the home so that there are now two independent home LANs: one for the data service and one for the new video service.

A third approach is for the new video service provider to collaborate with the Internet service provider (ISP) to choose a compatible IP address allocation scheme. Almost without exception, the DHCP protocol is used to allocate the configuration (IP address, subnet mask, default gateway, DNS) for the high speed Internet service. The video service would need to map onto this allocation.

Most ISPs use the DHCP protocol to avoid forcing the subscriber to have to manually configure settings in their modem and computer. DHCP fails if there is more than one service provider and more than one DHCP server because DHCP has no built-in concept of multi-service. DHCP can only be used if the video service provider collaborates with the high speed Internet service provider and one of the two service providers takes responsibility for the DHCP service.

Most DSL markets have tens or hundreds of different ISPs offering service and so it is complicated for the video service provider to make this many different arrangements. It is also complex if a customer wants to change from one service provider to another.

Alternately, the video service provider could try to explain how to reconfigure the subscriber's equipment to support the video and the data service. This is difficult because there are so many different types of end user equipment and because there are so many different ISPs as described above. In any case, most subscribers do not have the technical skills to confidently reconfigure their IP address parameters. Mistakes are easy to make and can be difficult and expensive for a service provider to debug. Fixing a mistake can often require an expert to visit the subscriber's home which is expensive.

Avoiding the multiple IP configuration problem by installing a second Ethernet network inside the home is an interesting solution but installing a new network can be expensive and sometimes difficult in an old home. Usually, the subscriber would also need to purchase a new DSL modem that can support two independent Ethernet ports because most DSL modems only support one local network. Most subscribers would not prefer the expense of recabling and buying a new modem if they could somehow reuse their existing cable and modem.

Many DSL modems now implement address sharing capabilities so that one public network address is shared between a potentially large number of computer or video devices. If a subscriber connects a set top box or other video device to the home LAN, the address which is configured for that device could be the same address being allocated to other subscribers' devices by their respective modems. In this way, the video terminal does not have a unique IP address with which to communicate with a centralised video server.

SUMMARY OF THE INVENTION

It is the object of the invention to provide a method for exchanging packets of user data between a terminal of a first network and a service provider of a second network by which the terminal and the service provider can identify each other.

This object is achieved by a method as described above, wherein the first network is connected to the second network by a gateway which has a unique connection to the service provider, the terminal has a first address which is unique within the first network, and the terminal is configurable with a second address which uniquely identifies a particular service from the service provider and which is unique within the second network, the method comprising the steps of: allocating the first address being unique within the first network to the terminal, sending a first packet of user data containing the first and second address from the terminal to the service provider which identifies the first packet by the presence of the second address and extracts the first address from the first packet, and sending a second packet of user data containing the first address from the service provider to the terminal which identifies the second packet by the presence of the first address.

By making use of this method, the terminal and the service provider can identify each other even when several terminals are present in the first network and several service providers are present in the second network, and the allocation policies of the service providers interfere with each other. In the above method, the first packet can be sent to the second address and the second packet can be sent to the first address, but it is also possible to use the first and second address only as identifiers and to transfer the packets between the terminal and the service provider without using the addresses as pointers, as will be described below.

In a preferred variant, the unique connection is a virtual connection and the service provider uniquely identifies the gateway based upon the identity of the virtual connection on which the traffic from the gateway arrives at the service provider. In case that the second network is the Internet, the Internet Protocol (IP) is used for data transfer. Traditionally, applications using the IP rely on a unique IP address per terminal or per application. The unique nature of the IP address traditionally allows servers to unambiguously identify the originator of each message. However, if the connection to a server through which a message is received is unique, that is it connects to a unique and known destination, then the server may infer the identity of the originator on the basis of the identity of the connection through which it was delivered. If a service provider, such as a video server, is connected using connection oriented techniques, all messages arriving at the video server on a particular subscriber's path termination are certain to have originated from that subscriber gateway, regardless of the IP address that the subscriber's video equipment is using.

In a further preferred variant, the unique virtual connection is established through ATM VP/VC addressing and/or VLAN IDs, and the service provider preferably performs VLAN stacking. Some public high speed data services technologies (e.g. ADSL) are connection oriented. Although DSL connections are most often deployed using ATM networking (with ATM VP/VC addressing), service providers (such as video servers) are most often deployed using Ethernet networking. Ethernet networks are generally operated in a connectionless manner. However, a technique known as VLAN Tagging has been standardised by the IEEE as 802.1q in order to allow Ethernet networks to be partitioned into virtually unique LANs. VLANs can be used to extend the ATM concept of virtual connection onto a connectionless Ethernet network by assigning a unique mapping of one VLAN ID to each configured ATM VP/VC. In this way, a unique ATM connection from a particular DSL subscriber may be mapped to a unique VLAN ID terminated by a particular video server.

According to the IEEE 802.1q standard, there can be up to 4096 VLAN ID tags used on an Ethernet. In those applications in which this is not a sufficient quantity, such as when there are more than 4096 unique connections required, VLAN tags can be "stacked" so that a VLAN is contained within a VLAN and VLAN stacking is now becoming more commonly implemented in modern LAN switching equipment. So in order to support end to end connection oriented paths between Ethernet based servers and ATM based DSL subscribers, VLAN stacking at the server can be mapped into ATM VP/VCs from the subscribers at the appropriate network device.

The trick now is that the first multicast packet from the subscriber gateway towards the service provider arrives at the service provider with a (stacked) VLAN header. The service provider must note the incoming (stacked) VLAN identifier on every incoming packet in order that it can respond to the right customer by sending the response back with the same (stacked) VLAN identifier. In this way, the service provider can tolerate one customer using an IP address range on their home LAN that one or more different customers is also using: the VLAN tags uniquely identify each customer.

In a further variant of the method, the service provider is one of a plurality of service providers, each of which providing either video, Internet or other services, and the service providers which do not provide the particular service corresponding to the second address disregard the first packet of user data. When several service providers are present, the first packet is not necessarily sent only to the service provider which offers the particular service the subscriber desires, but it may be sent to the other service providers as well. In this case, the service providers which do not provide the particular service detect that they can discard the first packet of user data by not recognizing the second address.

In a further preferred variant, the first packet of user data is a multicast data packet, the second address is a multicast address, and the gateway replicates the packet and transmits it to each of a plurality of service providers. The multicast packet, being a particular class of IP packet, avoids some of the complexity of needing to require explicit configuration of destination addresses or routes. It does so because IP forwarding devices such as layer 2 bridges or routers are often configured to replicate multicast packets onto each of their outgoing connections. Thus, if a customer device such as a set top box sends a multicast packet onto the home LAN, the subscriber's modem will replicate a copy of the multicast packet towards the ISP and a second copy of the multicast packet towards the video service provider.

This invention proposes that the subscriber video service application running in the video terminal sends multicast packets of video control data towards the video service provider specifically to avoid the necessity to configure the customer modem to support a routing protocol, to avoid needing to statically configure the subscriber modem with routes towards the video service provider and to avoid needing to configure the set top box device with a default gateway address and a subnet mask.

In yet a further variant, the second address is pre-configured into the application or in a set-up file of the terminal, or the terminal retrieves the second address from a remote location, preferably from the second network. The second address can be pre-configured in the terminal, but it is also possible that the terminal is pre-configured with an address of a location (e.g. URL) that stores the second address in the second network. The terminal then uses the address to connect to the URL and retrieves the second address (or second addresses, if there is more than one). It is also possible that the second address is provided to the terminal by other means.

In a particularly advantageous variant, the first network is a LAN, the first address is an IP address, and the second network is the Internet. In this variant, it is preferred that the gateway comprises a DSL modem or other broadband access device and a DHCP server for allocating the IP address to the terminal.

In a further preferred variant, after the exchange of two packets of user data, ongoing communication can take place in a variety of different means using a variety of protocols. In fact, the method for exchanging data packets will not be useful unless there is ongoing communication—the purpose of the initial two packet exchange is that the service provider and terminal can establish a means by which to identify each other in ongoing communications.

It is also advantageous when the second packet of user data is a multicast packet. In this case, the service provider sends the second packet towards the subscriber's gateway which connects the second network towards the subscribers individual first network. The gateway multicasts the packet onto the first network where all terminals receive it. Because the second packet contains the first address, which is uniquely attributed to the particular terminal on the first network from which the first packet originated, the other terminals on the first network discard the second packet.

Further advantages can be extracted from the description and the enclosed drawing. The features mentioned above and below can be used in accordance with the invention either individually or collectively in any combination. The embodiments mentioned are not to be understood as exhaustive enumeration but rather have exemplary character for the description of the invention.

BRIEF DESCRIPTION OF THE DRAWINGS

The invention is shown in the drawing.

In FIG. 1, an end user home LAN as a first network 1 is shown, the LAN being connected to the Internet (second network 2) via a DSL modem as a gateway 3. The first network 1 comprises several user terminals of which an Internet terminal 4a and a video terminal 4b are shown in FIG. 1. The Internet terminal 4a is used for communication with an Internet service provider (ISP) 5a within the second network 2. The video terminal 4b is a set top box and is used for communicating with a broadband entertainment video service provider 5b within the second network 2.

Figure 1:
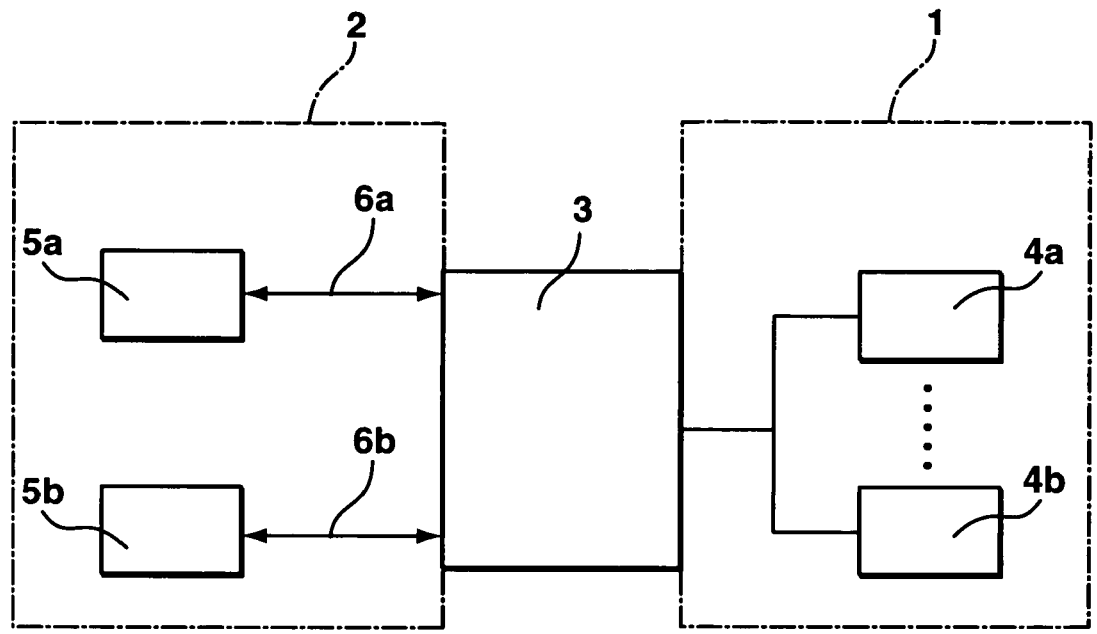
FIG. 1 shows a first network with a plurality of terminals and a second network with a plurality of service providers with which the method according to the invention is performed.

Whereas the terminals 4a, 4b are connected to the gateway 3 on the same LAN, each of the two service providers 5a, 5b is connected to the gateway 3 through a individual, unique connection 6a, 6b, both of which are established as virtual connections.

It should be noted that there exists a difference between services provided by the Internet service provider 5a on the one hand and the video service provider 5b on the other hand. Namely, a high speed Internet service is interactive and communicative like a telephone service being a client/client service, as it is often desirable to allow other users on the Internet to contact a particular subscriber and in order to support this, the subscriber needs a unique address with which other Internet users can address the subscriber. Video services are not communicative in the same way. They are client/server services. The video subscriber needs a dialogue with a video server but not with other video subscribers. That is, the nature of video service does not require the capability for two different video subscribers to communicate with each other for the purpose of delivering the video service, such that no unique IP address is necessary for identifying them. However, the service provider must still uniquely identify each subscriber gateway, for example for the purpose of uniquely accounting a usage bill for each subscriber gateway.

Normally, when communicating using the Internet Protocol, each device must be assigned at least a unique IP address, a subnet mask for its local network, a default gateway address through which it can reach IP hosts on different local networks and the address of a Domain Name Server (DNS) through which it can discover the IP addresses of common name services. Internet Service Providers often provide this information using protocols such as DHCP or DHCP in connection with additional protocols, especially for services which are ultimately delivered to equipment connected on home LANs.

The parameters mentioned above are generally unique per service provider. That is, the Internet service provider 5a generally provides each subscriber with one or more IP addresses, the subnet mask for the local network, a default gateway address and the address of a DNS. The video service provider 4b would generally need to supply the same set of parameters, but most likely with a different set of values.

The DHCP protocol was not designed to auto-configure more than one service from one service provider. If two different DHCP servers are placed onto the same network, a race occurs between the two servers and the first response is generally the configuration which is accepted by the subscriber equipment. Thus, if both the Internet service provider 5a and the video service provider 5b offered their own DHCP servers, the subscriber's Internet terminal 4a may receive configuration from the video service provider 5b and the subscriber's video terminal 4b might receive configuration from the Internet service provider 5a. This is not a desirable or workable outcome.

More commonly, the subscriber's gateway 3 (DSL modem) is configured as a router and has its own in-built DHCP server for the local devices. The subscriber's modem receives a DHCP address from the ISP 5a but allocates different addresses to the local devices through its own internal DHCP server.

The approach proposed in this invention is to maintain the same IP address allocation system as the subscriber and ISP 5a have deployed for the high speed Internet service. Thus, the video terminal 4b may receive a DHCP allocation from the ISP, or from the subscriber's DSL routing modem (gateway 3). The value of the address and the configurations for subnet mask, default gateway and DNS server are not important because these parameters are not used in the operation of the control protocol for the video service.

Normally, the local addresses are from special IP address ranges which have been deemed private and thus are non-routable and non-unique. In this case, the DSL modem must map the private addresses to the legitimate DHCP received address from the ISP.

For establishing data transfer between the service providers 5a, 5b and the terminals 4a, 4b in a correct manner, it is then first of all necessary that each of the terminals 4a, 4b can be uniquely identified within the first network 1. For that purpose, a first (individual) address is allocated to each of the terminals 4a, 4b, which is unique within the first network 1. In the present case, each of the terminals 4a, 4b can receive an IP address allocation using whatever means is available on the subscriber's home LAN. Whatever this method, the terminals 4a, 4b will receive IP addresses which are unique on the LAN but not necessary globally unique or unique across all the service provider's customers.

When the subscriber's video service terminal 4b needs to communicate with the video service provider 5b, it should address its packets towards a pre-configured second, multicast address. The particular multicast address should be chosen so that it is unique to the video service provider 5b, or for a particular service offered by the video service provider 5b. When the user requests a video service from the video service provider 5b, the video terminal 4b generates a first data packet containing the first address and the second address. The second address can be pre-configured into the application of the terminal 4b, or it can be pre-configured in a set-up file of the terminal 4b, or it can be established by other means, e.g. by retrieving the second address from a remote location. The latter can be done by pre-configuring the video service terminal 4b with an address of a location in the Internet that stores the unique second address: for example, the video service terminal 4b can be pre-configured with the URL "get-my-address.service-provider.com". The video service terminal 4b uses the pre-configured address to contact the video service provider 5b through the Internet, potentially through a different Internet Service Provider (independently chosen by the subscriber). The information returned to the video terminal 4b then indicates the explicit second address (or second addresses if more than one) for the video service provider 5b.

The first packet of user data generated in the video terminal 4b is a multicast packet. When the subscriber's gateway 3 (DSL modem) receives the multicast, it forwards the multicast packet to at least the video service provider 5b. If the packet is forwarded to another service provider, such as the Internet service provider 5a, it will be ignored by the other service provider because the second address was chosen to be unique to the video service provider 5b. The video service provider 5b, on the other hand, may have configured its video server to recognise the second address and accordingly will recognise and process the first packet.

The video service provider 5b receives the multicast packet on a well-defined connection which is unique to the subscriber gateway 3. The video service provider 5b thus infers the identity of the subscriber gateway 3 because the first packet was delivered on that subscriber's unique connection (second connection 6b).

The video service provider 5b examines the incoming packet's IP source address (first address) to discover the IP address which was configured into that subscriber's video service terminal 4b. The particular IP address need not be unique amongst all the subscribers of the video service provider 5b. When the video server returns communication to the video service terminal, it will set the IP destination address in the packet to be equal to the first address (IP source address) it formerly discovered from the incoming first packet of user data.

The video service provider 5b then sends a second packet of user data containing the first address to the video service terminal 4b. The second packet arrives back at the subscriber's modem (gateway 3), and the modem will forward or bridge the packet onto the home LAN. On the home LAN, the video terminal 4b will recognise the locally unique, first address (IP address) with which it was previously configured and thus will receive the second packet.

The concept described above allows the video service provider 5b when it receives a message to uniquely identify the subscriber gateway 3 from which originated the communication, to configure the subscriber's network gateway 3 to route the video control messages to and from the video terminal 4b, and allows the video terminal 4b of the subscriber to be simply configured with an address to which to send video control messages.

Although a static "well known" multicast address is required so that the video terminal 4b can contact its server, this is not a major drawback because video terminals are generally preconfigured with applications to access the middleware. The video server 5b needs to support VLANs and possibly VLAN stacking and needs to be developed to base a subscriber's identity upon the incoming connection of VLAN ID rather than the IP address. The video server 5b also needs to be developed to echo the incoming source IP address in as the outgoing destination address. The approach is fully compatible with the existing ASAM 73xx. The approach is also fully compatible with existing customer modems which support more than one bridged connection towards the DSL network (which is almost all modems).

In this way, the video terminal 4b can initiate unique communication with the video service provider 5b without having to implement complex configuration at the subscriber premises. The driver to simplify the customer configuration is that there are (potentially) millions of different customers, but only one video service provider 5b. Therefore, simplifying the customer configuration at the expense of marginally making the service provider more complex is a good trade off.

Figure 2:
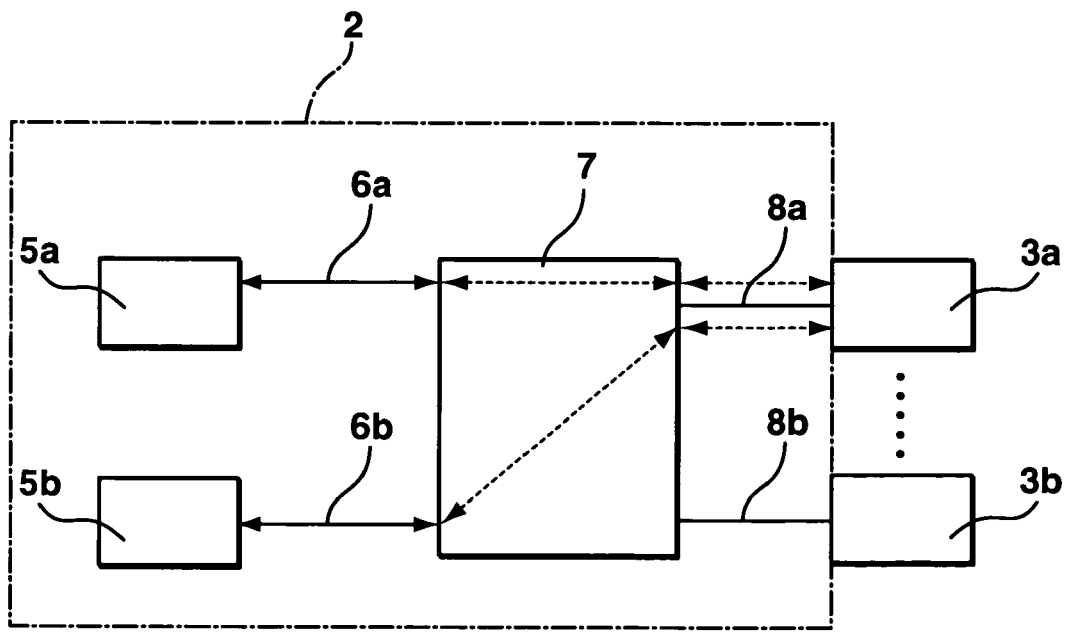
FIG. 2 shows a second network implementing a separate virtual connection from each of a plurality of service providers to each of a plurality of subscriber gateways using a DSLAM.

FIG. 2 illustrates how the unique connections shown in FIG. 1 can be established as virtual connections. For this purpose, the second network 2 is shown, being connected to a plurality of gateways, two of which (gateway 3a, 3b) are represented in FIG. 2. Each of the gateways 3a, 3b is connected to a local network (not shown) and to a Digital Subscriber Line Access Multiplexer (DSLAM 7) via DSL lines 8a, 8b.

The DSLAM 7 (broadband access provider) connects each customer gateway 3a, 3b towards their chosen service provider(s) 5a, 5b and vice versa. Each subscriber gateway 3a, 3b has a unique connection to each service provider 5a, 5b for each service at least so that private control information can be exchanged between the customer and the service providers 5a, 5b. Some services, such as multicast entertainment (e.g. pay TV) may have additional non-unique (shared) connections between the service provider and many customers. For the private connections (DSL lines 8a, 8b), ATM VP/VCs are most often used. Each subscriber has a unique ATM VP/VC per service provider but its not important that its ATM, it's important that its unique.

The DSLAM 7 is connected to the service providers 5a, 5b via unique connections 6a, 6b. By using the DSLAM 7 as a switch, the unique connections 6a, 6b can be extended from the service providers 5a, 5b to the gateways 3a, 3b through the DSL lines 8a, 8b. The individual, unique connections between the first gateway 3a and the Internet service provider 5a and the video service provider 5b, respectively, are represented in FIG. 2 by dashed arrows.

The connections from the access provider to the service providers often use Ethernet VLANs instead of ATM. For this to work, the broadband access provider uniquely maps each VLAN (or stacked VLAN) identifier into the correct ATM VP/VC for the correct subscriber. ATM VP/VC and VLAN tags are not the only means used throughput the world. There are several other arrangements for providing unique (connection oriented) paths between a service provider, through an intermediary broadband access provider (e.g. DSLAM 7) and the end subscriber gateway. In the present case, the first unique connection 6a between the DSLAM 7 and the Internet service provider 5a is established by using VLAN ID addressing. The second unique connection 6b between the DSLAM 7 and the video service provider 5b is established by ATM VP/VC addressing.

DSLAMs have already been deployed for high speed Internet services and carriers are looking to open new revenue streams by deploying value added services such as broadband entertainment. In order to cost effectively deploy these services, there must be zero impact on the existing high speed Internet services and also, there must be a low rate of failure/problems due to (for example) the addressing issues described herein.

With respect to the gateways 3, 3a, 3b, it should be noted that there are many different features and configurations which have been developed for DSL modems and other high speed Internet access equipment. Some modems behave as layer 2 learning bridges. Other modems behave as IP routers or IP forwarders. Yet other modems behave as either of these first two methods in conjunction with Network And Port address Translation (NAPT). Other configurations are possible. In order to support more than one service, separate connections can be established from the end user modem towards each of the different service providers. Typical modems implement a range of different techniques for forwarding traffic from the home LAN towards the appropriate service provider, including layer 2 bridging, layer 3 forwarding, layer 3 routing and so on.

Each of these different options requires slightly different configuration if two or more service providers are to be supported. Modems configured for learning bridge operation don't require any specific configuration however the customer equipment must be configured with the correct address for the default gateway for the particular service. On the other hand, routing or forwarding modems need to be configured with routes directing traffic towards either the ISP or towards the video service provider. NAPT modems may follow either of these two configuration strategies.

In summary, the method described above avoids the need for per user configuration of their gateway 3, 3*a*, 3*b* (modem/firewall/router), avoids address misallocation and misconfiguration between ISP and broadband entertainment video service providers, and the method is compatible with most existing DSL modems and layer 2 DSLAMs. Carriers and end users do not need to purchase new equipment in order to receive a broadband entertainment service. This solution is also compatible with Ethernet based video servers and ATM based DSL modems.

The invention claimed is:

1. A method for exchanging packets of user data between a terminal of a first network and a service provider of a second network, wherein the first network is connected to the second network by a gateway which has a unique connection to the service provider, the terminal has a first address which is unique within the first network, and the terminal is configurable with a second address which uniquely identifies a particular service from the service provider and which is unique within the second network, the method comprising the steps of:

- allocating the first address being unique within the first network to the terminal;
- sending a first packet of user data containing the first and second address from the terminal to the service provider which identifies the first packet by the presence of the second address and extracts the first address from the first packet; and
- sending a second packet of user data containing the first address from the service provider to the terminal which identifies the second packet by the presence of the first address, wherein
- the unique connection is a virtual connection and the service provider uniquely identifies the gateway based upon the identity of the virtual connection on which the first packet from the gateway arrives at the service provider and the unique connection is established through ATM VP/VC addressing and/or VLAN IDs, and the service provider performs VLAN stacking.

2. Method according to claim 1, wherein the service provider is one of a plurality of service providers, each of which providing either video, Internet or other services, and wherein the service providers which do not provide the particular service corresponding to the second address disregard the first packet of user data.

3. Method according to claim 2, wherein the first packet of user data is a multicast data packet, the second address is a multicast address, and the gateway replicates the first packet and transmits it to each of the plurality of service providers.

4. Method according to claim 1, wherein the second address is pre configured into the application or in a set-up file of the terminal, or the terminal retrieves the second address from a remote location, preferably within the second network.

5. Method according to claim 1, wherein the first network is a LAN, the first address is an IP address, and the second network is the Internet.

6. Method according to claim 5, wherein the gateway comprises a DSL modem or other broadband access device and a DHCP server for allocating the IP address to the terminal.

7. Method according to claim 1, wherein after the exchange of packets of user data, ongoing communication between the terminal and the service provider takes place.

8. Method according to claim 1, wherein the second packet of user data is a multicast packet.

* * * * *

UNITED STATES PATENT AND TRADEMARK OFFICE
CERTIFICATE OF CORRECTION

PATENT NO.        : 7,639,689 B2                                              Page 1 of 1
APPLICATION NO.   : 11/283710
DATED             : December 29, 2009
INVENTOR(S)       : Stefan Keller-Tuberg It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1039 days.

Signed and Sealed this

Twenty-first Day of December, 2010

David J. Kappos
*Director of the United States Patent and Trademark Office*